United States Patent Office 3,367,845
Patented Feb. 6, 1968

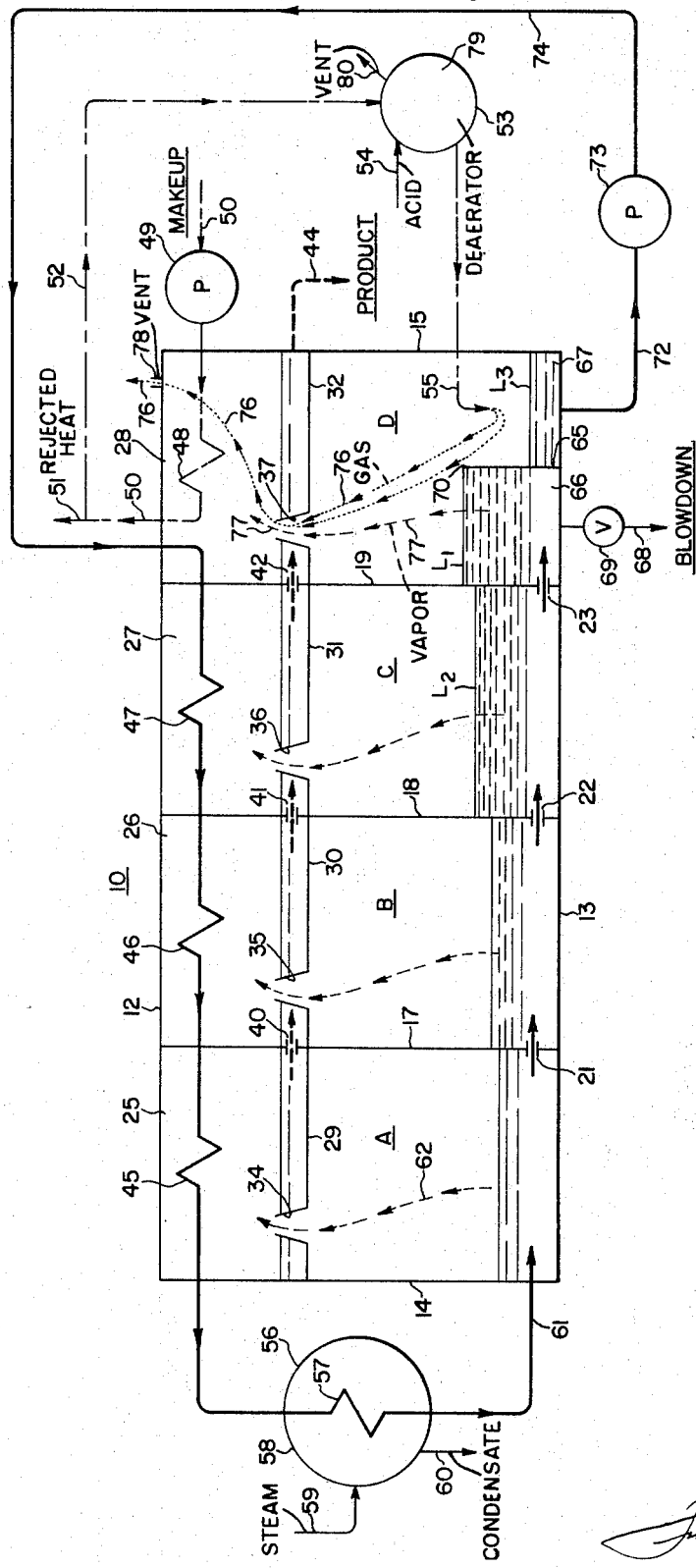
Feb. 6, 1968     R. L. COIT ET AL     3,367,845
FLASH EVAPORATION APPARATUS AND METHOD
Filed April 16, 1965
INVENTORS
Roland C. Coit
Ernest F. Stalcup
BY

3,367,845
FLASH EVAPORATION APPARATUS
AND METHOD
Roland L. Coit, Swarthmore, and Ernest F. Stalcup, Lansdowne, Pa., assignors to Westinghouse Electric Corporation, Pittsburgh, Pa., a corporation of Pennsylvania
Filed Apr. 16, 1965, Ser. No. 448,791
7 Claims. (Cl. 203—7)

ABSTRACT OF THE DISCLOSURE

This invention provides an arrangement in which the last and lowest pressure flash chamber of a plural-stage evaporator is provided with a wier dividing the lower portion of the chamber into two liquid collecting sections. One of the sections is in direct communication with the orifice from the preceding chamber and is provided with a blow-down connection, while the other section is disposed below the make-up water inlet and is provided with a recirculation connection.

This arrangement permits deaeration of the make-up water in the last chamber, thereby eliminating a separate deaeration vessel, while preventing mixing of the make-up water with that portion of the enriched brine that is blown down.

---

This invention relates to flash evaporators, more particularly to flash evaporators for converting impure water into pure or at least potable water, and has for an object to provide improved apparatus of this type.

Although flash evaporators are generally well known and are coming into extensive use for converting impure water, such as sea water or brackish water, into substantially pure water, there is a constant search for improvements to increase the operational efficiency, so that the cost of the product water may be reduced sufficiently to permit employment of such apparatus in environments where a great need exists, but where the economics involved do not at present justify the cost.

One of the known methods increases the operational efficiency of flash evaporators by pre-treatment of the incoming sea water with suitable chemicals, such as sulfuric acid or Hagevap, for example, manufactured by Hagan Chemical Company, for inhibiting the formation of hard scale in the evaporator and permitting operation at higher temperatures.

The thus treated sea water, after mineral enrichment incident to evaporation, is not economically susceptible of separation from the scale inhibiting chemicals. Hence, after the final state of evaporation, a portion of the enriched brine from the last stage is "blown down" or withdrawn from the system. The remaining portion is mixed with the pre-treated incoming sea water and recirculated through the system in a regenerative heat exchange circuit, thereby utilizing as much as possible the heat energy and the chemical additives put into the system.

It has been the practice to, first, withdraw all of the enriched brine from the last stage, second, blow down a portion of the thus withdrawn brine at the desired rate and, finally, mix the remainder with the freshly pre-treated sea water, thereby to minimize the loss of the freshly pre-treated sea water before evaporation. Such a system is shown, for example, in Goeldner Reissue Patent 23,232. Although this arrangement appears, at first blush, to be a desirable and simple solution to the problem of conservation of the treated sea water, it has at least one major disadvantage, namely, it requires additional apparatus to completely deaerate the sea water.

The above disadvantage is overcome in an expedient manner by the presently employed practice of spraying the freshly treated sea water into the last stage of the evaporator, thereby taking advantage of the reduced pressure ambient prevailing therein to provide deaeration of the incoming sea water without the inconvenience and cost of a separate deaeration vessel, as required by the first method. Where pre-deaeration is desired, a separate deaeration vessel may be employed and the additional deaeration attained in the last stage serves to assure substantially complete deaeration. As known in the art, deaeration of the incoming sea water is required to remove the dissolved air from the sea water and thereby reduce the corrosive tendency of the sea water.

Although the last described method is the more desirable of the two, it also has an unuseable aspect. Since the freshly treated sea water is mixed with the enriched brine in the last stage, when a portion of the resulting mixture leaving the last stage is blown down, a portion of the freshly treated sea water is lost to the system before any pure water is evaporated therefrom. Also, the chemical additives lost therewith are not utilized in the process and represent a cost item that can only be justified by the deaeration enhancement feature.

It is a primary object of this invention to provide apparatus and a method for converting impure water to pure water by flash evaporation, in which an evaporation stage of the evaporator is employed to deaerate freshly pre-treated impure water and yet a portion of the enriched brine in said stage can be withdrawn therefrom without dilution by the freshly pre-treated water.

Another object of the invention is to provide apparatus and a method for converting impure water to pure water by a multi-stage flash evaporator, in which the last and lowest pressure stage chamber of the evaporator is employed to deaerate the newly added impure make-up water and yet a portion of the enriched brine in the last stage is withdrawn therefrom and blown from the system without dilution by and/or loss of the newly admitted and deaerated impure water.

Still a further object is to provide apparatus and a method for attaining any of the foregoing objects, in which all of the impure water after deaeration in the last or other stages of the evaporator is directed through all of the stages for flash evaporation before being blown down.

Briefly, the invention provides an improvement in multi-stage flash evaporation apparatus for converting saline or other impure water into substantially pure or at least potable water. In accordance with the invention, newly added impure water is sprayed or otherwise injected into a flash evaporation chamber of the system where a portion of the enriched brine is withdrawn from the system, preferably the last stage evaporation chamber.

Suitable means, such as an upstanding wier or the like is provided in the selected chamber to divide the lower portion of the chamber into two liquid collecting sections, one for the enriched brine and communicating with the immediately adjacent higher pressure stage, so that the brine from the higher pressure stage is collected in said section for flash evaporation, and the other for the incoming impure water. In operation, the enriched brine from the preceding stage fills the one section, undergoes partial evaporation and continuously spills over the wier into the other section to mix with the incoming impure water.

A blow-down conduit is connected to the one section, thereby effecting removal of a portion of the enriched brine from the system for blow-down, while a recirculation conduit is connected to the other section, thereby effecting withdrawal of the mixture comprising the retained enriched brine and substantially all of the newly added impure water for recirculation and evaporation in the system.

Since the ambient pressure prevailing in the selected chamber is lower than atmospheric pressure, as the heated impure make-up water enters the chamber, the dissolved gases, such as air and other substantially incondensible gases, are released and join the vapor generated by the flashing brine. The vapor is subsequently condensed to form product water and the incondensible gases are ejected from the system in any suitable manner. Hence the make-up water is effectively deaerated in the flash evaporation chamber, yet prevented from mixing with the portion of enriched brine removed from the system.

The above and the objects are effected by the invention as will be apparent from the following description and claims taken in connection with the accompanying drawing, forming a part of this application, in which:

The sole figure is a schematic view of a multi-stage flash evaporation system incorporating the invention.

Referring to the drawing in detail, there is shown a multi-stage flash evaporation system of the recirculatory and regenerative heat exchange type, generally designated 10. The system employs a plurality of staged flash evaporation chambers (for example, four as illustrated) A, B, C and D, wherein chamber A is the first and highest pressure stage, B is the next, then C and finally D is the last and lowest pressure stage. As well known in the art, the flash evaporation chambers A, B, C and D may be formed by metal housing structure that is of generally parallelopiped shape comprising a top wall 12, a bottom wall 13, vertical end sidewalls 14 and 15, as well as front and rear walls (not shown), and vertical internal partitions 17, 18 and 19 which cooperate with the outer wall structure to form the chambers. The chambers A, B, C and D are disposed in liquid communication with each other by way of interconnecting slots or orifices 21, 22 and 23 formed in the partitions 17, 18 and 19, respectively, adjacent the bottom wall 13.

The housing structure further defines an equal plurality of vapor condensing spaces 25, 26, 27 and 28 for receiving the condensible vapors formed in the chambers A to D, respectively. The condensing spaces are disposed in the uppermost portion of the housing structure and are further defined by generally horizontally extending trays 29, 30, 31 and 32. The trays are further provided with horizontally extending vapor flow passages 34, 35, 36 and 37, respectively, so that the vapors formed in the chambers A, B, C and D may flow upwardly through the flow passages 34, 35, 36 and 37, respectively, into the condensing spaces 25, 26, 27 and 28, respectively.

The vertical partitions 17, 18 and 19 are further provided with apertures 40, 41 and 42 above the trays, so that the falling condensate collected in the tray 29 is free to flow through the associated aperture 40 into the tray 30 to join the condensate collected therein, thence through the aperture 41 into the tray 31 to join the condensate collected therein, and finally through the aperture 42 into the tray 32 for final collection and removal therefrom, as indicated by the line 44, as product water.

The condensing spaces 25 to 28 are provided with suitable surface heat exchanging or condensing tube structures 45, 46, 47 and 48 for regeneratively heating the circulating liquid by the heat extracted from condensing the vapors.

Sea water, brackish water or other impure water from any suitable source, such as a river, lake or the sea, is pressurized by a suitable pump 49 and directed through the tube structure 48, as indicated by the line 50, and then a portion of the thus heated water is ejected from the system and returned to the source as indicated by the line 51. The remaining portion, as indicated by the line 52, is directed to a suitable receptacle or vessel 53 and pretreated with any suitable chemical additive, such as Hagevap or sulfuric acid for example, as indicated by the arrow 54, and the thus pretreated impure water is then introduced into the chamber D of the last stage, as indicated by the line 55. This impure water is usually termed "make-up" water and is preferably sprayed into the chamber D or otherwise admitted thereto in a manner to promote deaeration thereof.

As well known in the art, the water is progressively heated before evaporation, and is accordingly directed successively through the heat exchangers 47, 46 and 45, and thence to a suitable top heater 56 comprising a heat exchanging tube structure 57 disposed within a suitable vessel 58 to which steam or other heated fluid is directed, as indicated by the arrow 59. In the resulting heat exchange, the steam is condensed and withdrawn as condensate through a drain outlet, as indicated by the arrow 60, and the heated make-up water is thence directed into the first flash evaporation chamber A as indicated by the line 61. As the thus heated water for evaporation is directed into the first and highest pressure stage chamber A, a portion thereof is flashed into vapor because of the reduced pressure ambient prevailing therein, and the vapor flashed therefrom is directed upwardly through the flow passage 34, as indicated by the dashed arrows 62 into the condensing space 25. The vapor is condensed by heat transfer from the heat exchanging tube structure 45 and falls into the tray 29 for collection. The unflashed liquid flows through the orifice 21 into the succeeding and lower pressure stage chamber B, wherein the same chain of events are attained, and the unflashed liquid thence flows through the orifice 22 into the chamber C for evaporation, and thence through the orifice 23 into the lowest and last pressure stage chamber D for final evaporation. As the liquid flows through the chambers A, B, C and D, with flash evaporation occurring, the liquid becomes more and more enriched with salts and other minerals and is termed enriched brine.

In accordance with the invention, the last chamber D is provided with an upwardly extending wier or plate 65 extending to a sufficient height, as will be further described, and dividing the lower portion of the chamber D into an enriched brine collection section 66 and a make-up water collection section 67. The enriched brine collecting section 66 has a blow-down line or conduit 68 connected thereto, and this blow-down line may have a suitable valve 69 interposed therein to regulate the rate of removal of enriched brine from the collection section 66 and from the system. As well known in the art, the blow-down line is employed to remove from the system a portion of the enriched brine, so that the liquid that circulates through the system may not exceed a predetermined level of salinity.

As diagrammatically shown, the make-up water is sprayed into the chamber D above the collection section 67 and is collected therein, and the height of the wier is sufficient to permit the retained portion of the enriched brine to flow over the top thereof as indicated at 70 and into the collection section 67. The wier 65 is of such height as to maintain the level $L_1$ of the brine in the collection chamber 66 at a level permitting flow therefrom into the chamber D through the orifice 23 to be sustained. Also, the liquid level $L_3$ in the collection section 67 is maintained at a level lower than the liquid level $L_1$ in the collection section 66. Hence, all of the newly added make-up water is collected in the collecting section 67 together with the portion of enriched brine flowing over the wier 65, to form a mixture of predetermined salinity for recirculation through the system. The thus attained mixture is withdrawn from the collection section 67, at a rate to maintain the prescribed level $L_2$ in the section 67, by a suitable conduit 72 having a pump 73 disposed therein, and this mixture is thence directed to the heat exchanging tube structure 47, as indicated by the conduit 74, thereby completing the recirculation flow circuit for the system.

Since the last chamber D is at the lowest pressure in the system and provides a large volumetric space, as the newly added make-up water is introduced thereinto by the line 55, deaeration of the heated make-up water is attained in a simple yet highly effective manner. More specifically, the air dissolved in the make-up water is readily expanded and separated due to the reduced atmosphere prevailing therein and the preliminary heating of the water by flow through the first heat exchanger 48. Accordingly, this air and other incondensible gases are also liberated and directed upwardly through the vapor flow passage 37, as indicated by the dotted arrows 76, into the condensing chamber 28 together with the vapor, as indicated by the dashed arrows 77, formed by flash evaporation in the chamber D. The vapors are condensed in the resulting heat exchange and drop into the tray 32 to join the condensate from the remaining condensing sections, while the incondensible gases liberated from the make-up water may be directed through a suitable vent 78 to the atmosphere. As known in the art, the vent 78 may further be provided, if desired, with suitable air injection means of any desired design or type.

From the above it will be seen that the last or lowest pressure stage chamber D is employed to attain the following functions in accordance with the invention:

(1) To flash vapor from the circulating body of liquid at the last and lowest pressure prevailing in the system;

(2) To collect the enriched brine for blow-down without dilution;

(3) To ensure that the make-up water directed thereinto to replenish the system is deaerated before circulation through the system;

(4) To ensure that all of the make-up water is directed through the system for evaporation before removal through the blow-down conduit;

(5) To permit and ensure mixing of the remaining enriched brine with the incoming impure water.

It will now be seen that the invention provides a simple yet highly effective arrangement for deaerating incoming sea water which utilizes the large volumetric space of the flash evaporation chamber without premature loss incident to blow-down of the enriched brine.

However, in many situations it is desirable to provide further and preliminary deaeration of the incoming sea water, since any air that is retained in the sea water renders the sea water highly corrosive to the metal structure of which the evaporation system is made. Accordingly, if desired, the mixing vessel 53 for the additives 54 may be of suitable size to provide a deaeration space 79 and the vessel 53 may further be provided with a vent for ejecting the liberated air, as indicated by the arrow 80.

Although the invention has been shown and described in conjunction with the purification of brackish sea water, it will be understood to those skilled in the art that it is not so limited, but is susceptible of various other changes and modifications without departing from the spirit and scope thereof. More particularly, it may be employed to remove substantially pure solvent from any solution, thereby to provide substantially pure solvent and a residual solution enriched with solute.

We claim as our invention:

1. In a recirculating multi-stage flash evaporation system for extracting a solvent from an impure solution, comprising
    a plurality of heat exchanging means including a top heating means for adding heat to the system,
    means for passing the solution through said heat exchanging means, thereby to heat the solution to a predetermined temperature,
    means defining a plurality of chambers for flash evaporation of at least a portion of the solvent from the thus heated solution, thereby to form condensible vapors, the said heat exchanging means being disposed in the chambers to preheat the feed solution and condense the vapors,
    said chambers being staged successively from a first and highermost pressure stage disposed in fluid receiving communication with said top heating means to a last and lowermost pressure stage and being in successive liquid flow communication with each other, whereby, as the solution flows from stage-to-stage with attendant partial flash evaporation of the solvent, a solution enriched with solute is attained, the improvement comprising
    means for blowing down from the system a portion of the enriched solvent from one of the lowermost pressure chambers,
    means for admitting make-up solution into said heat exchanging means of said one chamber to replenish the volume removed from the system by the blow-down means and vaporization, means for then admitting the make-up solution into said one chamber to deaerate the make-up solution and to bring the gaseous effluent of the deaeration into heat exchange relationship with the heat exchanging means of said one chamber,
    means for maintaining the ambient pressure in said one chamber below atmospheric pressure and effective to deaerate the make-up solution of dissolved gases,
    means provided in said one chamber for preventing loss of impure make-up solution through said blow-down means but permitting mixing of the remaining portion of the enriched solution with the deaerated make-up solution,
    and means for withdrawing said mixture from said one chamber,
    said mixture withdrawing means being connected to said heat exchanging means to complete a recirculation loop.

2. The structure recited in claim 1, wherein,
    the loss preventing means includes an upstanding member disposed in the one chamber and dividing the lower portion of the chamber into first and second liquid collecting sections, said first collecting section being in liquid transmitting communication with the blow-down means and said second collecting section, and said latter being in liquid transmitting communication with the mixture withdrawing means.

3. The structure recited in claim 1, wherein
    the loss preventing means includes means defining first and second liquid collecting sections in the one chamber,
    said first section is in liquid flow receiving communication with the adjacent higher pressure chamber and in liquid transmitting flow communication with the blow-down means, and
    said second section is in liquid flow receiving communication with said first section and in liquid flow transmitting communication with the mixture withdrawing means and arranged to collect substantially all of the admitted make-up solution.

4. The method of operating a recirculating multi-stage flash evaporation system for extracting water, from water containing impurities in solution, which method comprises the steps of
    passing impure water through heating means in communication with the flash vapor spaces of the system stages to heat the water to a predetermined temperature by condensing the vapors within the stages,
    directing the heated impure water through a series of associated flash evaporation chambers at successively lower pressures from a first and highermost pressure to a last and lowermost pressure below atmospheric pressure to effect staged partial flash evaporation in each chamber with an attendant release of said vapors and increase in solute concentration of the water and formation of an enriched solution,
    blowing down a portion of the enriched solution from one of the lower pressure chambers in a first liquid segregating section of said one chamber and transmitting the remaining portion to a second liquid segregating section in said one chamber, passing impure make-up water through the heating means in the flash vapor space of said one chamber, adding said preheated impure make-up water to said second section of said one chamber maintained at subatmospheric pressure to effect substantial deaeration of said make-up water and to replace the liquid removed from the evaporator by vaporization and blowing down, the released vapors from the enriched solution and the released gases from the preheated make-up solution in said one chamber passing in heat exchange with the make-up water in the heating means in said one chamber, venting said gases, mixing the remaining portion of the enriched solution with the make-up water in said second segregated section, and directing the mixture through said remaining heating means to maintain recirculation.

5. The method recited in claim 4, and further including the steps of treating the make-up water with a chemical additive to reduce the corrosion and/or scaling tendencies of the make-up water after said preheating step.

6. The method of operating a recirculating multi-stage flash evaporation system for extracting substantially pure water from a substantially impure water solution, which method comprises the steps of passing impure water through vapor condensing heating means to heat the water to a predetermined temperature, directing the heated impure water through a series of flash evaporation chambers at successively lower pressures from a first and highermost pressure to a last and lowermost pressure below atmospheric pressure to effect staged partial evaporation in each chamber with an attendant increase in solute concentration of the water and formation of an enriched solution, blowing down a portion of the enriched solution from a first segregated section of one of the lower pressure stages at a first rate, maintaining the level of the enriched solution in said section in said one stage at a first level, adding impure make-up water at a second and higher rate in another segregated section of said one stage to effect substantial deaeration of said make-up water, mixing the remaining portion of the enriched solution with the make-up water in said other section, maintaining the level of said mixture in said other section at a second level lower than that of the brine in said first section, and directing the mixture through said heating means to maintain recirculation directing the vapors from the one stage together with incondensible gases released from the make-up water by deaeration to said vapor-condensing heating means in said one stage to condense the vapors, and venting the incondensible gases from the system.

7. The method recited in claim 6, and further including the steps of preheating the make-up water before addition to the one stage, and treating the make-up water with a chemical additive to reduce the corrosion and/or scaling tendencies of the make-up water after said preheating step.

References Cited
UNITED STATES PATENTS 3,119,752  1/1964  Checkovich _____ 202—173 X
3,218,241  11/1965 Checkovich _____ 203—11 X

FOREIGN PATENTS 1,052,950  3/1959  Germany.

WILBUR L. BASCOMB, JR., *Primary Examiner.*

NORMAN YUDKOFF, *Examiner.*

J. SOFER, *Assistant Examiner.*